UNITED STATES PATENT OFFICE.

JOSEPH DELÉON, OF PARIS, FRANCE.

IMPROVEMENT IN THE MANUFACTURE OF BUILDING MATERIALS.

Specification forming part of Letters Patent No. 150,838, dated May 12, 1874; application filed April 22, 1874.

*To all whom it may concern:*

Be it known that I, JOSEPH DELÉON, of Paris, France, have invented Improvements in the Manufacture of Building Materials, of which the following is a specification:

My invention consists in the instantaneous hydraulic aggregation of materials for building and constructive purposes by the mixture of powdered limestone and sand with magnesia, chloride of magnesium, and carbonate of soda, also in a pulverized condition.

My process dispenses with any necessity for firing or baking, and enables the ceramic products to be employed immediately on its completion.

I can manufacture by my process, in which carbonate of soda plays more particularly the part of the hydraulic agent, products of various kinds, such as bricks, tiles, artificial stones, imitation marbles, lithographic stones, and others.

Although I desire to be at liberty to vary in each mixture the respective proportions of the three chemical substances above given—magnesia, chloride of magnesium, and carbonate of soda—so as to render them suitable for the object to be produced, yet I proceed to give some formulas which I have found to work well in practice, as illustrations and examples of my process.

*No. 1, for rough and solid bricks.*—Formula No. 1: Powdered limestone, 1,750 parts, by weight; sand, 750 parts, by weight; magnesia, 72 parts, by weight; chloride of magnesium, 100 parts, by weight; carbonate of soda, 25 parts, by weight.

The pulverized mixture is effected in the following manner: The limestone, sand, and magnesia are first mixed, and then the chloride of magnesium is added, after which the mixture is well stirred, and the carbonate of soda lastly added.

The whole mixture, after being well mingled, is submitted to molding, pressure, or other ordinary manipulation. The chemical substances—namely, the magnesia, the chloride of magnesium, and the carbonate of soda—immediately react upon one another, and the hydraulic aggregation is, so to speak, instantaneous, which permits the immediate employment of solid brick, which, thus manufactured, I have found, will support a pressure of over fifty tons.

When it is desired to manufacture tiles, paving-blocks, drainage-pipes, and similar articles, the three chemical substances are employed in the same relative proportions to one another as are given above, but are augmented by one-fourth in relation to the powdered limestone and sand.

*No. 2, hollow bricks.*—Formula No. 2: Powdered limestone, 1,356 parts, by weight; sand, 580 parts, by weight; magnesia, 55.75 parts, by weight; chloride of magnesium, 77.45 parts, by weight; carbonate of soda, 19.36 parts, by weight.

*No. 3, artificial stones.*—Formula No. 3: The powdered limestone alone is used; the sand is dispensed with; and the proportions of the three chemical substances are the same as when solid bricks are produced, (Formula No. 1.)

The powdered limestone can be mixed with calcined clay in proportions nearly equal, and with this mixture nearly the same results are obtained.

*No. 4, imitation marbles.*—Formula No. 4: Powdered marble, 5 parts, by weight; magnesia, chloride of magnesium, and carbonate of soda, mixed together in the proportions given in Formula No. 1, 1 part, by weight.

I can obtain from this mixture the most varied objects of art, such as statues, columns, vases, ornamented chimney-pieces, clock-cases, pedestals, tessellated pavements, and mosaics, enamels, and others, varying them all by ochers or mineral colors.

*No. 5, lithographic stones.*—With limestone, brought principally from the quarries of the Jura, or similar places, with the debris of lithographic stone, alone or mixed with limestone, lithographic stones may be obtained by the following mixture:

Formula No. 5.—Mixture of the three chemical materials, 40 parts; limestone or debris, 60 parts.

I can, lastly, by means of the three chemical agents so often mentioned above, obtain materials for building and constructions of all kinds in the arts.

I claim—

The before-described process for the manufacture of several building, art, and industry materials, and the compound, consisting of magnesia, chloride of magnesium, and carbonate of soda, in combination with limestone and sand, in various proportions, according to the destination.

In testimony whereof I have signed my name to this specification before two subscribing witnesses.

J. DELÉON.

Witnesses:
AMÉDÉE BOUSQUET,
ALBERT CAHEN, Jr.